United States Patent [19]

Nayebi et al.

[11] Patent Number: 5,686,974
[45] Date of Patent: Nov. 11, 1997

[54] METHOD OF AND APPARATUS FOR PROVIDING A HIGH SPEED VIDEO SWITCH

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 584,923

[22] Filed: Jan. 11, 1996

Related U.S. Application Data

[60] Provisional application No. 60/000,410 June 21, 1995, now abandoned

[51] Int. Cl.$^6$ .................................................. H04N 5/268
[52] U.S. Cl. .......................... 348/705; 348/698; 307/115; 327/407; 327/482
[58] Field of Search .................................. 348/705, 706, 348/609, 691, 694, 698, 598, 584; 340/825.03; 327/407, 411, 413, 482, 484, 489; 307/113, 115, 80, 85, 86, 87, 131; H04N 5/268

[56] References Cited

U.S. PATENT DOCUMENTS

| | | | |
|---|---|---|---|
| 4,145,719 | 3/1979 | Hand et al. | 348/705 |
| 4,349,750 | 9/1982 | Geurts | 348/705 |
| 4,572,967 | 2/1986 | Metz | 327/482 |
| 4,612,577 | 9/1986 | Keen | 348/705 |
| 5,262,861 | 11/1993 | Herz | 358/150 |
| 5,305,105 | 4/1994 | Heo | 348/705 |

*Primary Examiner*—John K. Peng
*Assistant Examiner*—Jeffrey S. Murrell
*Attorney, Agent, or Firm*—Haverstock & Associates

[57] ABSTRACT

A high-speed video switch uses a current-mode switch to switch between a first input video signal and a second input video signal. Each of the first and second input video signals are input to the video switch through clamping circuits which clamp a blank level of the input video signals to a predetermined constant level. Preferably, the blank level of the first and second input video signals are clamped to two volts. An output signal is output by the video switch which represents one of the input video signals. The video switch receives two control signals from the video system. The two control signals control which one of the input video signals is represented by the output signal. A back-to-back diode configured isolation circuit is used to isolate the one of the two input video signals which is not represented by the output signal.

19 Claims, 3 Drawing Sheets

METHOD OF AND APPARATUS FOR PROVIDING A HIGH SPEED VIDEO SWITCH

RELATED APPLICATION

This application claims priority under 35 U.S.C. §119(e) of the co-pending U.S. provisional application Ser. No. 60/000,410 filed on Jun. 21, 1995, now abandoned, and entitled "High-Speed Video Switch." The provisional application Ser. No. 60/000,410 filed on Jun. 21, 1995 and entitled "High-Speed Video Switch" is also hereby incorporated by reference.

FIELD OF THE INVENTION

The present invention relates to the field of switching between two input video signals to provide a single output video signal. In particular, the present invention relates to the field of high-speed switching between two input video signals without introducing noise or cross-talk into the output video signal.

BACKGROUND OF THE INVENTION

The technique of digitally encoding a video signal and particularly a composite video signal, is well known. Sampling pulses are generated in synchronism with a color video burst signal. The sampling pulses have a repetition rate that is a multiple of the burst signal frequency. Each sample of the color video signal is encoded, or digitized, such as by pulse code modulation (PCM). Digitally encoded video signals are used in time base error correction devices, noise suppression devices, the addition of various special video effects and the like. Digitally encoded video signals are particularly advantageous for recording and reproduction and also for special types of transmission.

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information.

The video signal can also be separated into a separate chrominance or C signal and separate luminance or Y signal. A properly configured television, monitor or display will accept the separate chrominance C and luminance Y signal.

Within a video system receiving or generating more than one input video signal it can be necessary to switch between the input video signals in order to provide an appropriate output signal to be displayed by a television, monitor or display. The video switches of the prior art which have been used to switch between two video signals are typically either a voltage-controlled switch or a voltage-controlled multiplexer as are well known in the art. These video switches of the prior art are generally not very fast and may introduce noise or cross-talk from the input signals, into the output video signal. What is needed is a video switch which is faster than the video switches of the prior art and which will not introduce noise or cross-talk into the output video signal.

SUMMARY OF THE INVENTION

A high-speed video switch uses a current-mode switch to switch between a first input video signal and a second input video signal. Each of the first and second input video signals are input to the video switch through clamping circuits which clamp a blank level of the input video signals to a predetermined constant level. Preferably, the blank level of the first and second input video signals are clamped to two volts. An output signal is output by the video switch which represents one of the input video signals. The video switch receives two control signals from the video system. The two control signals control which one of the input video signals is represented by the output signal. A back-to-back diode configured isolation circuit is used to isolate from the output signal the one of the two input video signals which is not represented by the output signal.

DETAILED DESCRIPTION OF THE PREFERRED EMBODIMENT

The high-speed video switch of the present invention uses a current-mode switch to switch between a first input video signal and a second input video signal. Each of the first and second input video signals are input to the video switch through backporch clamp circuits which clamp the blank level of the input video signals to a constant, known level. Preferably, the blank level of the first and second input video signals are clamped to two volts. The video switch receives two control signals which control which one of the first and second input video signals are output by the video switch. Because the switching between the two video input signals is done with a current mode circuit, it is inherently faster than the video switches of the prior art. A back-to-back diode configured isolation circuit is used to isolate from the output signal the one of the two input video signals which is not represented by the output signal. This isolation circuit eliminates noise within the output signal and crosstalk between the signals.

Figure 1:
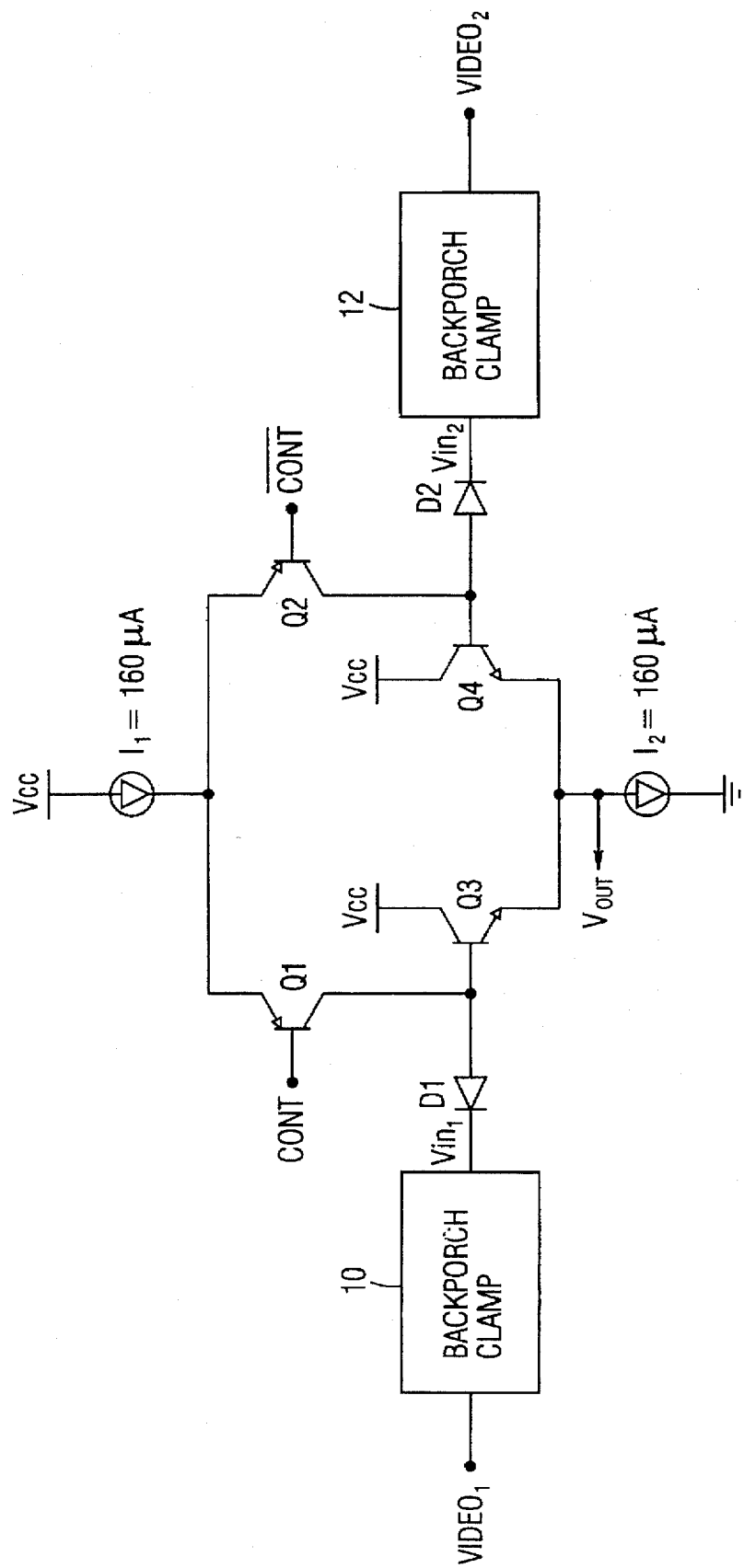
FIG. 1 illustrates a schematic diagram of a high-speed video switch of the present invention.

A schematic diagram of the high-speed video switch of the present invention is illustrated in FIG. 1. A first input video signal Video1 is coupled to the input of a backporch clamp circuit 10. A second input video signal Video2 is coupled to the input of a backporch clamp circuit 12. The backporch clamp circuits 10 and 12 clamp the blank level of the first and second input video signals Video1 and Video2 to a constant, known level without altering the other components of the signal. The values of the components of the video signal are determined by other circuitry within the video system by determining the amplitude of the components with respect to the blank level. The backporch soft-clamp circuit sets the blank level of the video signal to a known value for determining the true value of the components of the input signals Video1 and Video2. In the preferred embodiment of the present invention the blank level of the input video signals Video1 and Video2 are set to two volts by the backporch clamp circuits 10 and 12, respectively. Preferably, the backporch clamp circuits used within the high-speed video switch of the present invention are implemented as taught in the co-pending patent application Ser. No. 08/585,298, having the same filing date as the present application and entitled "Composite Video Signal Backporch Soft-Clamp System Using Servo Loop."

The backporch clamp circuit 10 provides an input video signal Vin1 to the high-speed video switch which represents the input video signal Video1 with its blank level set to two volts. The backporch clamp circuit 12 provides an input video signal Vin2 to the high-speed video switch which represents the input video signal Video2 with its blank level set to two volts. The input video signal Vin1 is coupled to a cathode of a diode D1. An anode of the diode D1 is coupled to a base of an npn transistor Q3 and to a collector of a pnp transistor Q1. The input video signal Vin2 is coupled to a cathode of a diode D2. An anode of the diode D2 is coupled to a base of an npn transistor Q4 and to a collector of a pnp transistor Q2.

The collector of the transistor Q3 is coupled to a supply voltage VCC. The collector of the transistor Q4 is coupled to the supply voltage VCC. The emitter of the transistor Q3 is coupled to the emitter of the transistor Q4 and to the first terminal of a current source I2, thereby providing an output node Vout from which the output of the high-speed video switch is provided. The second terminal of the current source I2 is coupled to ground. The transistors Q3 and Q4 are coupled together to form a differential pair.

Two control signals Cont and $\overline{Cont}$ are provided to the high-speed video switch of the present invention for controlling which one of the input video signals Video1 or Video2 is output. The control signal Cont is coupled to the base of the transistor Q1. The control signal $\overline{Cont}$ is coupled to the base of the transistor Q2. The control signal $\overline{Cont}$ is an inverse of the control signal Cont. The emitter of the transistor Q1 is coupled to the emitter of the transistor Q2 and to the first terminal of a current source I1. The second terminal of the current source I1 is coupled to the supply voltage VCC. In the preferred embodiment the current sources I1 and I2 each supply a current equal to 160 microamps (μA). Together, the transistors Q1 and Q2 form a differential pair.

The high-speed video switch of the present invention will output a signal representative of either the input video signal Video1 or the input video signal Video2 depending on the state of the control signals Cont and $\overline{Cont}$. The backporch clamp circuits 10 and 12 clamp the blank level of the two input video signals Video1 and Video2, respectively, to a level equal to two volts, without altering the other components of the signal. The output Vin1 of the backporch clamp circuit 10 is therefore a video signal representative of the input video signal Video1 with its blank level clamped to a level equal to two volts. The output Vin2 of the backporch clamp circuit 12 is therefore a video signal representative of the input video signal Video2 with its blank level clamped to a level equal to two volts. The video signals Video1 and Video2 are then applied to the switching circuit of the present invention. A predetermined one of the video signals Vin1 and Vin2 is output by the switching circuit depending on the state of the control signals Cont and $\overline{Cont}$.

The control signals Cont and $\overline{Cont}$ are provided by the video system of which the high-speed video switch of the present invention is a part. The control signals Cont and $\overline{Cont}$ control which one of the video signals Vin1 or Vin2 is output by the high-speed video switch. When the control signal Cont is at a logical low voltage level and the control signal $\overline{Cont}$ is at a logical high voltage level, the tail current for the differential pair, made up by the transistors Q1 and Q2, flows from the current source I1 through the transistor Q1. The transistor Q2 is therefore turned off when the control signal Cont is at a logical low voltage level and the control signal $\overline{Cont}$ is at a logical high voltage level. Because no current is flowing through the transistor Q2, the diode D2 and the base-to-emitter junction of the transistor Q4 form a back-to-back diode configuration which results in no current flowing through the base of the transistor Q4. This effectively turns off the transistor Q4 causing the tail current for the differential pair, made up by the transistors Q3 and Q4, to flow through the transistor Q3. In this case, the collector current from the transistor Q1 flows through the diode D1. Ignoring the negligible base current of the transistor Q3, the current through the diode D1 is represented by the following equation:

$$I_{D1}=I_{CQ1}=I_{CQ3}$$

Thus, the current flowing through the diode D1 is equal to the current flowing through the collectors of the transistors Q1 and Q3. For this reason, the voltage drop across the diode D1 is equal to the voltage drop across the base-to-emitter junction of the transistor Q3. The output voltage Vout is therefore equal to the voltage level of the input video signal Vin1 as demonstrated by the following equation:

$$Vout=Vin1+V_{D1}-V_{BEQ3}=Vin1$$

As demonstrated by the above equation, because the voltage drop across the diode D1 is equal to the voltage drop across the base-to-emitter junction of the transistor Q3, the voltage level at the output node Vout is equal to the voltage level of the input video signal Vin1. Therefore, when the control signal Cont is at a logical low voltage level and the control signal $\overline{Cont}$ is at a logical high voltage level, the high-speed video switch of the present invention will output the input video signal Vin1.

When the control signal Cont is at a logical high voltage level and the control signal $\overline{Cont}$ is at a logical low voltage level, the tail current for the differential pair, made up by the transistors Q1 and Q2, flows from the current source I1 through the transistor Q2. The transistor Q1 is therefore turned off. Because no current is flowing through the transistor Q1, the diode D1 and the base-to-emitter junction of the transistor Q3 form a back-to-back diode configuration which results in no current flowing through the base of the transistor Q3. This effectively turns off the transistor Q3 causing the tail current for the differential pair, made up by the transistors Q3 and Q4, to flow through the transistor Q4. In this case, the collector current from the transistor Q2 flows through the diode D2. Ignoring the negligible base current of the transistor Q4, the current through the diode D2 is represented by the following equation:

$$I_{D2}=I_{CQ2}=I_{CQ4}$$

Thus, the current flowing through the diode D2 is equal to the current flowing through the collectors of the transistors Q2 and Q4. For this reason, the voltage drop across the diode D2 is equal to the voltage drop across the base-to-emitter junction of the transistor Q4. The output voltage Vout is therefore equal to the voltage level of the input video signal Vin2 as demonstrated by the following equation:

$$Vout=Vin2+V_{D2}-V_{BEQ4}=Vin2$$

As demonstrated by the above equation, because the voltage drop across the diode D2 is equal to the voltage drop across the base-to-emitter junction of the transistor Q4, the voltage level at the output node Vout is equal to the voltage level of the input video signal Vin2. Therefore, when the control signal Cont is at a logical high voltage level and the control signal $\overline{Cont}$ is at a logical low voltage level, the high-speed video switch of the present invention will output the input video signal Vin2.

Figure 2A:
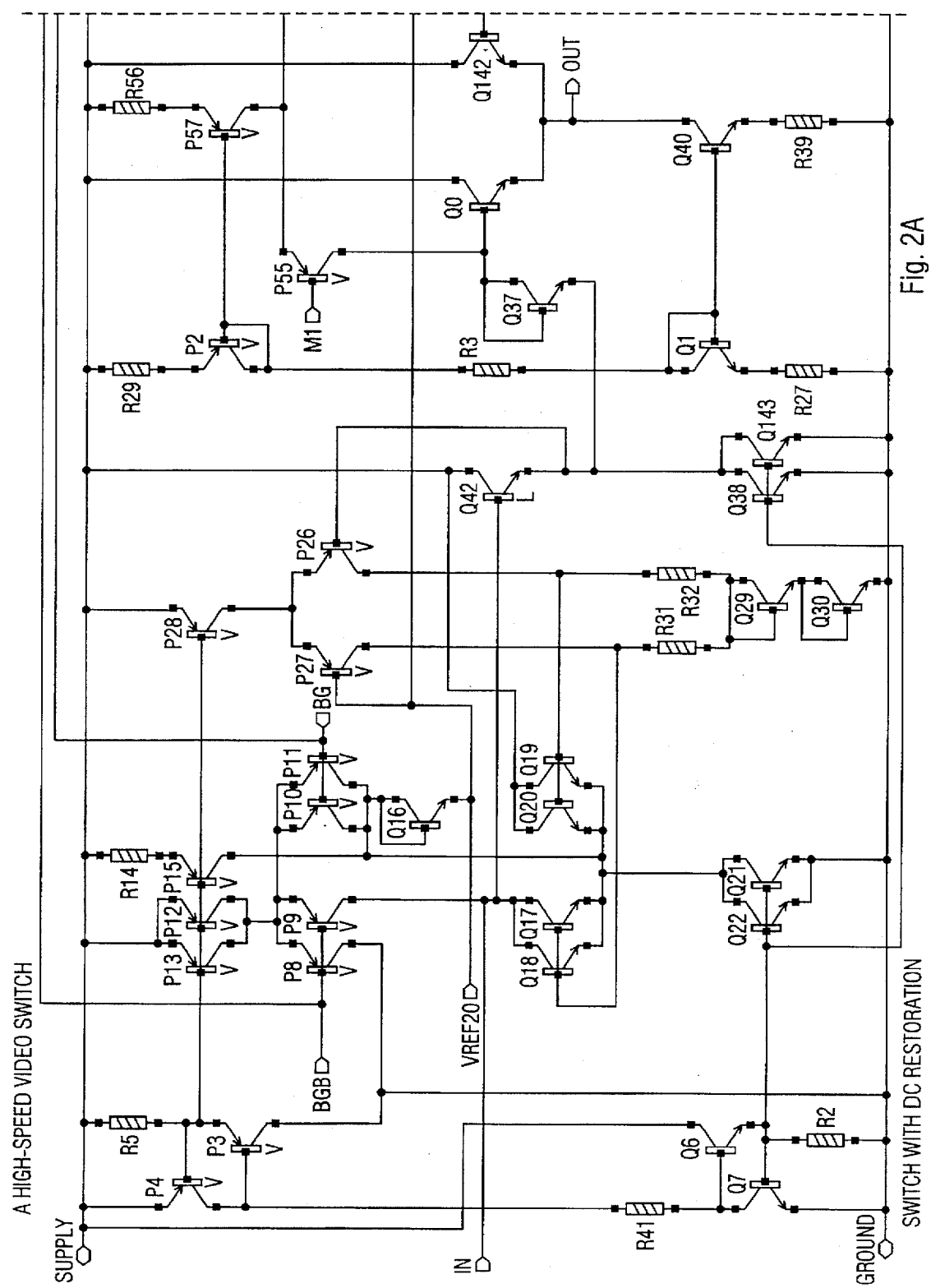
FIG. 2 illustrates a detailed circuit schematic of the high-speed video switch of the present invention.
Figure 2B:
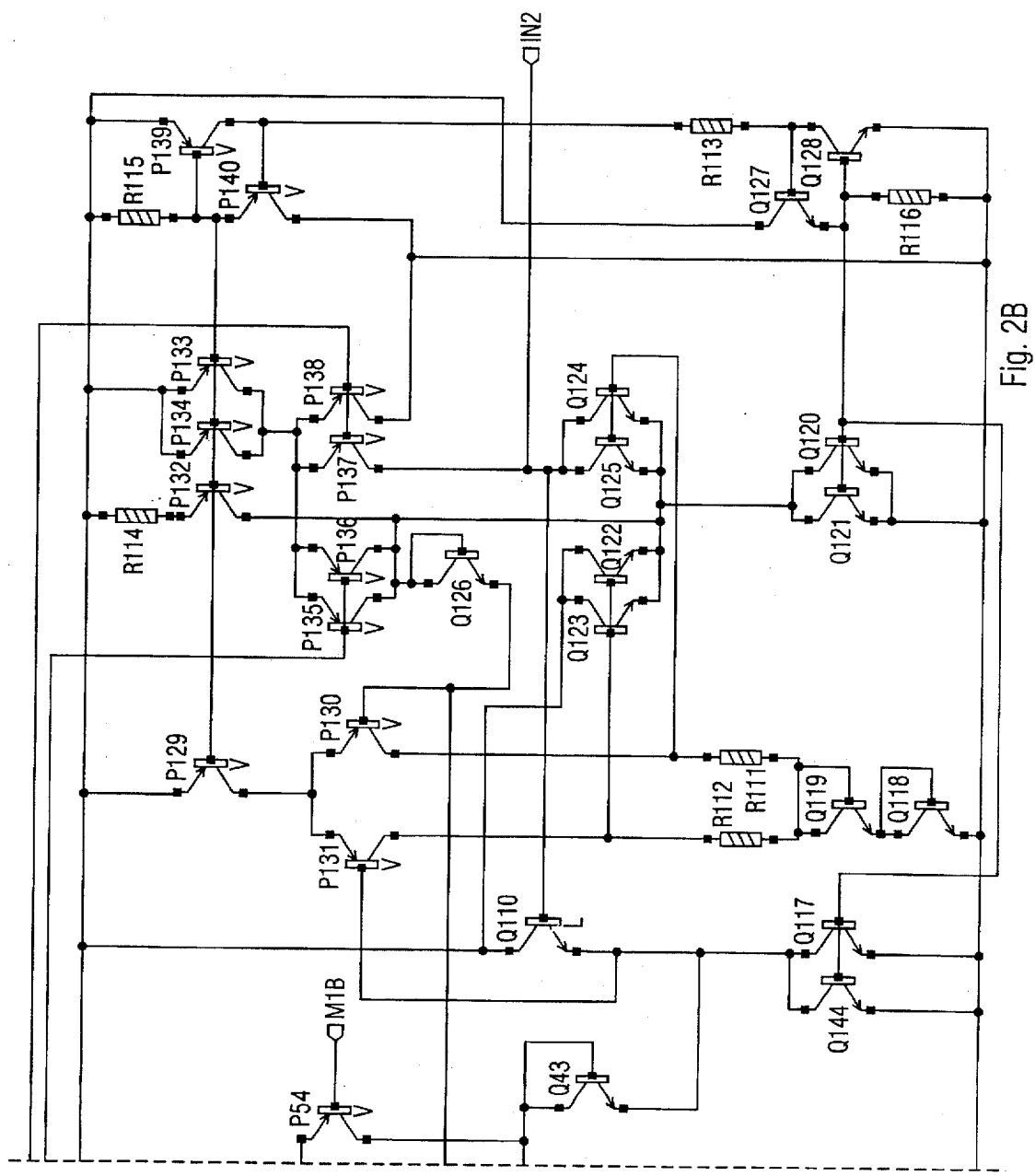

A detailed circuit schematic of the preferred embodiment of the high-speed video switch of the present invention is illustrated in FIG. 2. The preferred embodiment of the present invention is implemented within a video/graphics overlay integrated circuit, Part No. CXA2015Q, which will be available from Sony Corporation of America, 3300 Zanker Road, San Jose, Calif. 95134. Within this integrated circuit, a first high-speed video switch according to the present invention is used to switch between an analog separate chrominance signal and a digitally encoded separate chrominance signal. A second high-speed switch according to the present invention is used to switch between an analog separate luminance signal and a digitally encoded separate luminance signal when separate video signals Y and C are being output.

In this manner, as described above, the high-speed video switch of the present invention will output either the input video signal Vin1 or the input video signal Vin2 as controlled by the control signals Cont and $\overline{\text{Cont}}$. When the control signal Cont is at a logical low voltage level and the control signal $\overline{\text{Cont}}$ is at a logical high voltage level the high-speed video switch will output the input video signal Vin1. When the control signal Cont is at a logical high voltage level and the control signal $\overline{\text{Cont}}$ is at a logical low voltage level the high-speed video switch will output the input video signal Vin2. Because the switching within the high-speed video switch of the present invention is done within the current mode, the switch performs faster than the video switches of the prior art, without introducing any noise or cross-talk between the signals.

While the preferred embodiment of the present invention has been illustrated and described as an integrated circuit using bipolar transistors, it will be apparent to a person of ordinary skill in the art that the circuit of the present invention may be implemented using other device technology, including but not limited to CMOS, MOS, discrete components and ECL.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A video switching circuit for generating an output signal representative of one of a plurality of input video signals comprising:
   a. a plurality of input receiving circuits each configured for receiving one of the plurality of input video signals;
   b. a current source for generating a predetermined current; and
   c. current mode switching circuit a coupled to the current source and to each of the plurality of input receiving circuits for routing the predetermined current to a selected one of the plurality of input receiving circuits for generating an output signal representative of one of the plurality of input video signals.

2. The video switching circuit as claimed in claim 1 further comprising a control signal receiving circuit configured for receiving one or more control signals and coupled to the current mode switching circuit for controlling which one of the plurality of input video signals is represented by the output signal.

3. The video switching circuit as claimed in claim 2 further comprising a plurality of clamping circuits, each one of the clamping circuits coupled to a respective one of the plurality of input video signals for clamping a blank level of the plurality of input video signals to a constant level.

4. The video switching circuit as claimed in claim 3 further comprising a plurality of isolation circuits each coupled to a respective one of the plurality of input video signals for isolating all of the plurality of input video signals from the output signal except for the one of the plurality of input video signals which is represented by the output signal.

5. The video switching circuit as claimed in claim 4 wherein each of the plurality of isolation circuits include a back to back diode configuration.

6. The video switching circuit as claimed in claim 5 wherein the constant level is equal to two volts.

7. A method of switching between a plurality of input video signals and generating an output video signal representative of one of the plurality of input video signals comprising the steps of:
   a. receiving a plurality of input video signals;
   b. receiving one or more control signals specifying an appropriate one of the plurality of input video signals to be output;
   c. providing a current-mode control signal from a single current source in response to the one or more control signals; and
   d. generating an output video signal representative of an appropriate one of the plurality of input video signals as controlled by the current-mode control signal.

8. The method as claimed in claim 7 further comprising the step of clamping a blank level of each of the plurality of input video signals to a predetermined constant level.

9. The method as claimed in claim 8 wherein the predetermined constant level is equal to two volts.

10. The method as claimed in claim 7 further comprising the step of isolating all of the input video signals from the output signal except for the appropriate one of the plurality of input video signals which is represented by the output signal.

11. The method as claimed in claim 10 wherein the step of isolating is completed using a back to back diode configured circuit.

12. A video switching circuit for generating an output signal representative of one of a plurality of input video signals comprising:
   a. a plurality of input receiving circuits each configured for receiving one of the plurality of input video signals;
   b. a control signal receiving circuit configured for receiving one or more control signals, wherein the control signals specify which one of the plurality of input video signals are to be output;
   c. a current source for generating a predetermined current;
   d. a current mode switching circuit coupled to the control signal receiving circuit, to each of the plurality of input receiving circuits and to receive the predetermined current, wherein the current mode switching circuit routes the predetermined current to a selected one of the plurality of input receiving circuits for generating an output signal representative of one of the plurality of input video signals as controlled by the one or more control signals, wherein the current mode switching circuit includes an isolation circuit for each of the plurality of input video signals for isolating all of the plurality of input video signals from the output signal except for the one of the plurality of input video signals which is represented by the output signal.

13. The video switching circuit as claimed in claim 12 further comprising a plurality of clamping circuits, each one coupled to a respective one of the plurality of input video signals for clamping a blank level of the plurality of input video signals to a predetermined constant level.

14. A video switching circuit for generating an output signal representative of a predetermined one of a first input video signal and a second input video signal, the video switching circuit comprising:
 a. a first receiving circuit configured for receiving the first input video signal;
 b. a second receiving circuit configured for receiving the second input video signal;
 c. a current mode switching circuit including a current source for generating a predetermined current configured for receiving one or more control signals and coupled to the first and second receiving circuits for routing the predetermined current to a selected one of the first and second receiving circuits for generating an output signal representative of a predetermined one of the first and second input video signals.

15. The video switching circuit as claimed in claim 14 further comprising a first clamping circuit coupled to the first receiving circuit and to the current mode switching circuit for clamping a first blank level of the first input video signal to a predetermined level.

16. The video switching circuit as claimed in claim 15 further comprising a second clamping circuit coupled to the second receiving circuit and to the current mode switching circuit for clamping a second blank level of the second input video signal to the predetermined level.

17. The video switching circuit as claimed in claim 16 wherein the predetermined level is equal to two volts.

18. A video switching circuit for generating an output signal representative of a predetermined one of a first input video signal and a second input video signal, the video switching circuit comprising:
 a. a first receiving circuit configured for receiving the first input video signal;
 b. a second receiving circuit configured for receiving the second input video signal;
 c. a current mode switching circuit configured for receiving one or more control signals and coupled to the first and second receiving circuits for generating an output signal representative of a predetermined one of the first and second input video signals;
 d. a first clamping circuit coupled to the first receiving circuit and to the current mode switching circuit for clamping a first blank level of the first input video signal to a predetermined level, wherein the current mode switching circuit further comprises a first isolation circuit coupled to the first clamping circuit and to the current mode switching circuit for isolating the first input video signal from the output signal when the output signal represents the second input video signal; and
 e. a second clamping circuit coupled to the second receiving circuit and to the current mode switching circuit for clamping a second blank level of the second input video signal to the predetermined level.

19. A video switching circuit for generating an output signal representative of a predetermined one of a first input video signal and a second input video signal, the video switching circuit comprising:
 a. a first receiving circuit configured for receiving the first input video signal;
 b. a second receiving circuit configured for receiving the second input video signal;
 c. a current mode switching circuit configured for receiving one or more control signals and coupled to the first and second receiving circuits for generating an output signal representative of a predetermined one of the first and second input video signals;
 d. a first clamping circuit coupled to the first receiving circuit and to the current mode switching circuit for clamping a first blank level of the first input video signal to a predetermined level, wherein the current mode switching circuit further comprises a first isolation circuit coupled to the first clamping circuit and to the current mode switching circuit for isolating the first input video signal from the output signal when the output signal represents the second input video signal; and
 e. a second clamping circuit coupled to the second receiving circuit and to the current mode switching circuit for clamping a second blank level of the second input video signal to the predetermined level, wherein the current mode switching circuit further comprises a second isolation circuit coupled to the second clamping circuit and to the current mode switching circuit for isolating the second input video signal from the output signal when the output signal represents the second input video signal.

* * * * *

UNITED STATES PATENT AND TRADEMARK OFFICE
CERTIFICATE OF CORRECTION

PATENT NO.   : 5,686,974
DATED        : November 11, 1997
INVENTOR(S)  : Mehrdad Nayebi et al It is certified that error appears in the above-identified patent and that said Letters Patent is hereby corrected as shown below:

IN THE CLAIMS

In column 5, line 52, delete "current mode switching circuit a coupled" and insert --a current mode switching circuit coupled--.

Signed and Sealed this

Thirty-first Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,686,974

DATED : November 11, 1997

INVENTOR(S) : Mehrdad Nayebi et al

It is certified that error appears in the above-identified patent and that said Letters Patent is hereby correct as shown below:

TITLE PAGE:

<u>IN THE REFERENCES CITED</u>

The following patent was not included in the printed patent references cited:
  Insert --3,582,973, 6/1971, Dorward, 327/219--.

Signed and Sealed this

Twenty-seventh Day of October, 1998

Attest:

BRUCE LEHMAN

*Attesting Officer*  *Commissioner of Patents and Trademarks*